(No Model.)
R. E. ALFRED.
GATE.
No. 544,716.
Patented Aug. 20, 1895.
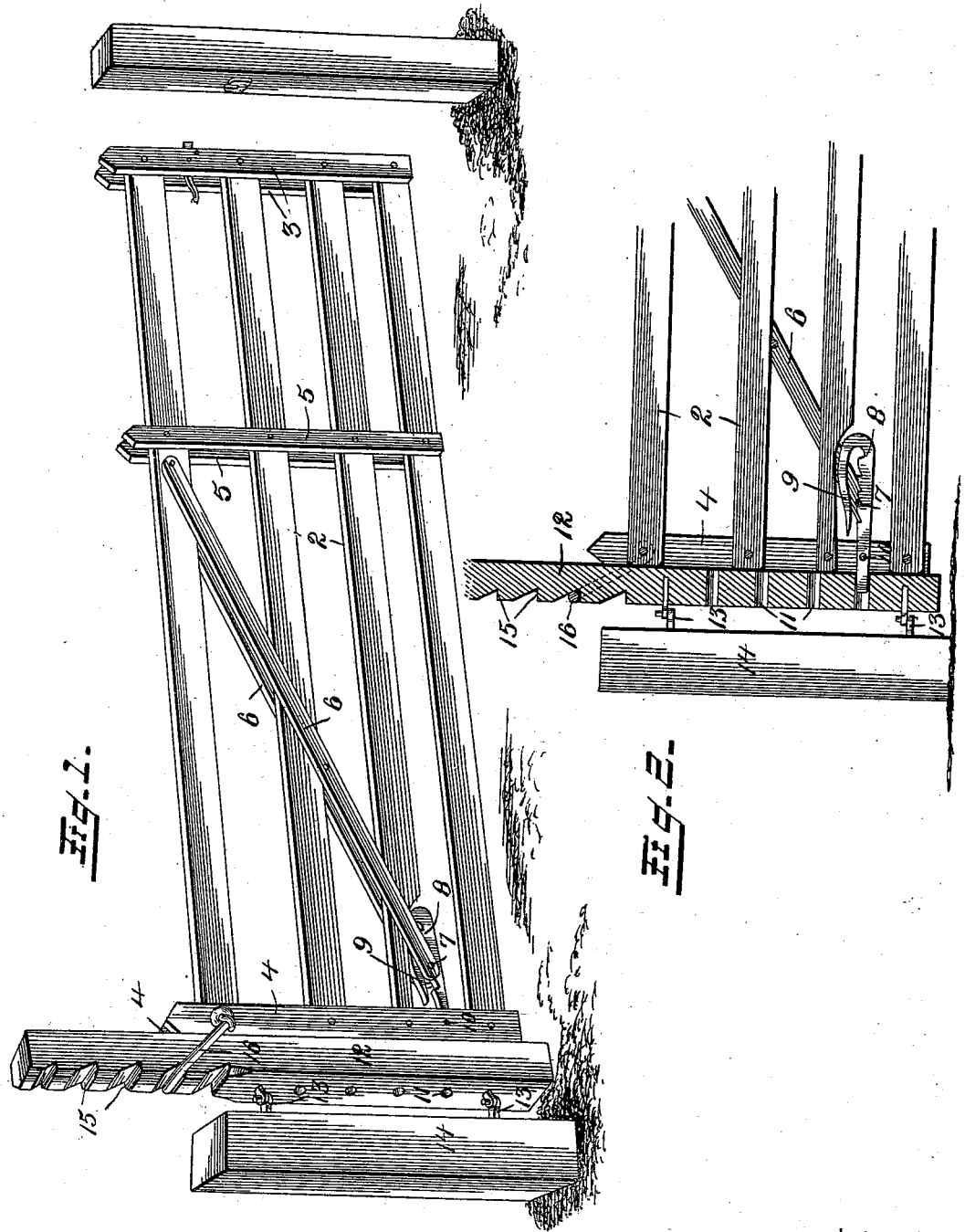
Witnesses
H. J. Koerth.
J. F. Riley
By his Attorneys.
Inventor
Ralph E. Alfred
C. A. Snow & Co.

UNITED STATES PATENT OFFICE.

RALPH E. ALFRED, OF WESTON, WEST VIRGINIA.

GATE.

SPECIFICATION forming part of Letters Patent No. 544,716, dated August 20, 1895.

Application filed June 8, 1895. Serial No. 552,126. (No model.)

*To all whom it may concern:*

Be it known that I, RALPH E. ALFRED, a citizen of the United States, residing at Weston, in the county of Lewis and State of West Virginia, have invented a new and useful Gate, of which the following is a specification.

The invention relates to improvements in gates.

The object of the present invention is to improve the construction of swinging gates, and to provide a simple and inexpensive one which may be readily adjusted to counteract sagging and to afford a passage-way at its bottom for small animals.

The invention consists in the construction and novel combination and arrangement of parts, hereinafter fully described, illustrated in the accompanying drawings, and pointed out in the claims hereto appended.

In the drawings, Figure 1 is a perspective view of a gate constructed in accordance with this invention and shown partly open. Fig. 2 is a vertical sectional view of the rear portion of the gate, the latter being arranged at an elevation.

Like numerals of reference indicate corresponding parts in both figures of the drawings.

1 designates a gate constructed of any suitable material and composed of horizontal rails 2, pivoted to end bars 3 and 4 and intermediate bars 5, arranged at opposite sides of the rails, as shown; and the parts of the gate have a pivotal movement on one another to raise the front end of the gate to counteract sagging, as will be readily understood. The gate is held rigidly against such pivotal movement by means of an inclined brace 6, composed of a pair of bars located at opposite sides of the rails 2 and pivoted at their upper ends to the top rail and having their lower ends connected by a transverse fastening device 7, such as a bolt or the like, and engaging a rack-bar 8. The rack-bar 8 is provided at its upper edge with a series of teeth, any one of which is adapted to be engaged by the fastening device 7, and the rack-bar is provided at its front end with an extension 9, disposed over the toothed portion and forming a keeper. The rack-bar is pivoted intermediate of its ends, between the rear vertical bars 4 of the gate, by a transverse fastening device 10, and its rear portion projects from the back of the gate and forms a tenon, and is adapted to engage any one of a series of sockets 11 of a vertical supporting-bar 12, which is connected by any suitable form of hinges 13 to a post 14. The upper portion of the supporting-bar 12 is provided with a series of shoulders 15, arranged at intervals corresponding to the intervals of the sockets 11, which are located at the bottom or lower portion of the bar 12.

The gate is adapted to be elevated or adjusted vertically to raise it above the ground to clear obstructions, such as snow-drifts or the like, or to afford a passage-way for small stock, and it is retained at any desired adjustment by the said rack-bar and by a rectangular bail or loop 16, receiving the upper portion of the supporting-bars 12 and hinged at opposite sides to the outer faces of the bars 4 of the gate.

Any suitable form of latch may be employed, and it will be apparent that the gate is exceedingly simple and inexpensive in construction, that it is capable of ready adjustment to counteract sagging, and that it may be readily secured at the desired elevation to enable it to swing clear of obstructions or to form a passage for small animals. It will also be apparent that the improvements are applicable to all kinds of swinging gates where such adjustments are desirable.

Changes in the form, proportion, and the minor details of construction may be resorted to without departing from the principle or sacrificing any of the advantages of this invention.

What I claim is—

The combination of a post, a supporting bar hinged to the post and provided at its upper portion with a series of shoulders, and having at its lower portion a corresponding series of sockets, a gate having its bars pivotally connected with one another and capable of adjustment, a rack-bar mounted on the gate at the back thereof, and provided at its front portion with a series of teeth, and having its rear portion projecting from the gate and arranged to engage the sockets of the supporting bar, and an inclined brace pivoted at its upper end to the gate and having its lower end engaging the rack-bar, substantially as described.

In testimony that I claim the foregoing as my own I have hereto affixed my signature in the presence of two witnesses.

RALPH E. ALFRED.

Witnesses:
J. P. SNYDER,
CHAS. T. TURNER.